United States Patent
Gaa-Frost et al.

(10) Patent No.: US 8,046,755 B2
(45) Date of Patent: Oct. 25, 2011

(54) DEPLOYING SOFTWARE BASED ON A CALCULATED DEPLOYMENT RISK LEVEL

(75) Inventors: Bettina Gaa-Frost, Ketsch (DE); Stefan Krimmel, Muehlhausen (DE); Sebastian Pulkowski, St. Leon-Rot (DE)

(73) Assignee: SAP AG (DE)

( * ) Notice: Subject to any disclaimer, the term of this patent is extended or adjusted under 35 U.S.C. 154(b) by 1488 days.

(21) Appl. No.: 11/323,664

(22) Filed: Dec. 30, 2005

(65) Prior Publication Data

US 2007/0157195 A1 Jul. 5, 2007

(51) Int. Cl.
G06F 9/445 (2006.01)

(52) U.S. Cl. ........ 717/177; 717/168; 717/171; 717/172; 717/174

(58) Field of Classification Search ........... 717/174–178
See application file for complete search history.

(56) References Cited

U.S. PATENT DOCUMENTS

| | | | |
|---|---|---|---|
| 5,883,955 A | 3/1999 | Ronning | |
| 5,907,617 A | 5/1999 | Ronning | |
| 6,177,932 B1 | 1/2001 | Galdes et al. | |
| 6,199,204 B1 | 3/2001 | Donohue | |
| 6,202,207 B1 | 3/2001 | Donohue | |
| 6,725,399 B1* | 4/2004 | Bowman | 714/38.14 |
| 6,904,449 B1* | 6/2005 | Quinones | 709/203 |
| 7,035,809 B2* | 4/2006 | Miller et al. | 705/8 |
| 2002/0124245 A1* | 9/2002 | Maddux et al. | 717/176 |
| 2002/0156874 A1* | 10/2002 | Suorsa et al. | 709/220 |
| 2003/0005326 A1* | 1/2003 | Flemming | 713/201 |
| 2003/0120589 A1* | 6/2003 | Williams et al. | 705/38 |
| 2003/0158760 A1* | 8/2003 | Kannenberg | 705/4 |
| 2003/0172367 A1* | 9/2003 | Kannenberg | 717/101 |
| 2003/0188290 A1* | 10/2003 | Corral | 717/101 |
| 2004/0010772 A1* | 1/2004 | McKenna et al. | 717/101 |
| 2004/0102923 A1* | 5/2004 | Tracy et al. | 702/181 |
| 2004/0143811 A1* | 7/2004 | Kaelicke et al. | 717/101 |
| 2004/0205727 A1* | 10/2004 | Sit et al. | 717/125 |
| 2005/0132206 A1 | 6/2005 | Palliyil et al. | |

(Continued)

OTHER PUBLICATIONS

Stoneburner, Gary Goguen, Alice, and Feringa, Alexis. "Risk Management Guide for Information Technology Systems" Computer Security Division Information Technology Laboratory National Institute of Standards and Tehcnology Jul. 2002 <http://csrc.nist.gov/publications/nistpubs/800-30/sp800-30.pdf> pp. 1-55.*

Alleman, Glen B. Information Technology Risk Management. Copyright 2002 Niwot Colorado <http://www.niwotridge.com/PDFs/Risk%20Managment%20Combined.pdf> pp. 1-22.*

(Continued)

*Primary Examiner* — Michael J Yigdall
*Assistant Examiner* — Samuel Hayim
(74) *Attorney, Agent, or Firm* — Fish & Richardson P.C.

(57) ABSTRACT

A computer-implemented method may include receiving first data that includes one or more configuration parameters that characterize an intended deployment of software and a target computer system on which the software is to be deployed. The computer-implemented method may further include calculating a deployment risk level based on the first data, determining whether the calculated deployment risk level is less than a threshold risk level, and transmitting second data to target computer system authorizing deployment of the software if the deployment risk level is less than the threshold risk level. In some implementations, the software is enterprise software. The one or more configuration parameters may include hardware specifications of the target computer system, and the calculated deployment risk level may be based on threshold recommended hardware specifications of the target computer for running the software to be deployed.

19 Claims, 14 Drawing Sheets

U.S. PATENT DOCUMENTS

| | | |
|---|---|---|
| 2005/0149759 A1* | 7/2005 | Vishwanath et al. ......... 713/201 |
| 2005/0198556 A1 | 9/2005 | Tripp et al. |
| 2005/0203968 A1 | 9/2005 | Dehghan et al. |
| 2005/0210459 A1 | 9/2005 | Henderson et al. |
| 2005/0257215 A1 | 11/2005 | Denby et al. |
| 2006/0184926 A1* | 8/2006 | Or et al. ........................ 717/168 |
| 2006/0235732 A1* | 10/2006 | Miller et al. ...................... 705/7 |

OTHER PUBLICATIONS

Alberts, Christopher Dorofee, Audrey. "An Introduction to the OCTAVE Method" Software Engineering Institute Carnegie Mellon Jan. 30, 2001 <http://www.cert.org/octave/methodintro.html> pp. 1-11.*

* cited by examiner

DEPLOYING SOFTWARE BASED ON A CALCULATED DEPLOYMENT RISK LEVEL

TECHNICAL FIELD

This disclosure relates to deploying software based on a calculated deployment risk level.

BACKGROUND

Organizations may face risk any time they deploy new organization management software. This may be particularly true if the new software replaces existing, proven processes and methods for operating the organization—which is generally true when an organization deploys or updates an enterprise computing system or enterprise resource planning software.

Once implemented, enterprise computing systems may facilitate efficient planning and delivery of a large organization's products and services to consumers. Such systems may incorporate an extensive array of computer hardware such as application servers, data servers, networking equipment and client computer devices. The client computer devices may access the data in application servers via a network such as an intranet or via secure channels over the internet. Data and application servers may be centrally organized in one or more data centers, or the servers may be distributed across departments and sites of the organization.

An enterprise computing system may employ various software packages to manage data within the organization. Many large organizations utilize enterprise software, such as enterprise resource planning (ERP) software to centrally manage data for various departments of the organization and to automate various organization activities. In general, ERP software allows a company to efficiently process data that is used by multiple departments. As an example, a manufacturing company may employ an ERP system to manage its manufacturing, sales and financial departments. More particularly, an ERP system may provide resources for a sales department to track orders for products; resources for a purchasing department to track orders for parts needed to manufacture the ordered products; resources for a manufacturing department to track products through the manufacturing process and to manage inventory; resources for a sales department to track order fulfillment and generally manage interactions with customers; and resources for a financial department to track parts costs, pay suppliers, track orders and process payments for fulfilled orders.

The software portion of an enterprise computing system may include various modules that may be used alone or integrated with other modules. For example, an organization may employ a supply chain management (SCM) module to support the organization's manufacturing operations; an organization may employ a customer relations management (CRM) module to log interactions between, for example, a marketing department and a prospective customer or a support department and a current customer; and an organization may employ a financials module to budget its operations, pay suppliers and employees, and receive payment from customers. Some organizations may employ an ERP system that integrates each of these modules into a single system.

Enterprise systems are generally very complex and expensive to implement. Portions of an enterprise system may be customized to meet specific needs of an organization. To implement an enterprise system, an organization may employ various business and technical consultants to analyze the organization's workflows and processes; identify appropriate enterprise software components; install the components on the organization's existing computer hardware infrastructure or on new computer hardware; integrate various software components; and customize various user interfaces provided by the components, in order to meet specific needs of the organization. For many organizations, this implementation process may require many months of effort and may cost between tens of thousands of dollars and millions of dollars. Failed implementations are especially costly.

An enterprise system may be deployed in phases. For example, a "pilot environment" may be set up during a configuration phase. The pilot environment may be set up to mimic a "production environment," but on a smaller scale. In some implementations, enterprise software in a pilot environment may have reduced functionality. For example, certain features may be disabled in order to make the configuration process more efficient. Moreover, the pilot environment may be configured for a limited number of users (e.g., just enough "representative" users to test the sample with of the full pool of users who will user who will use the "production environment" system).

SUMMARY

This document describes systems and techniques for deploying software based on a calculated deployment risk level. In general, the chance of success for deployment of a large software package, such as an ERP system, may be increased by rigorously holding a project back until certain known risks are addressed. Moving forward with a large software deployment without adequately addressing risks may cause the project to fail. Failure increases costs of both the software customer (untapped or under-tapped investment) and the software provider (increased support costs, loss of goodwill in the marketplace). Two points may be particularly critical in the timeline of many large software deployments: the early planning stages, before an organization begins installing or configuring software; and the launch period, during which time many projects go from "pilot stage" to "production stage." Addressing risks at these two points may significantly increase the success of a software deployment.

Advantages of the systems and techniques described herein may include any or all of the following. Software consumers may be more successful in deploying software by being apprised of risks while there is still time to address them and avoid failure. A software provider may better protect its goodwill by helping its customers avoid failure. In the process, the software provider may forge better long-term relationships with its customers.

The general and specific aspects may be implemented using a system, a method, or a computer program, or any combination of systems, methods, and computer programs. The details of one or more implementations are set forth in the accompanying drawings and the description below.

DESCRIPTION OF DRAWINGS

These and other aspects will now be described in detail with reference to the following drawings.

Like reference symbols in the various drawings indicate like elements.

DETAILED DESCRIPTION

Figure 1A:
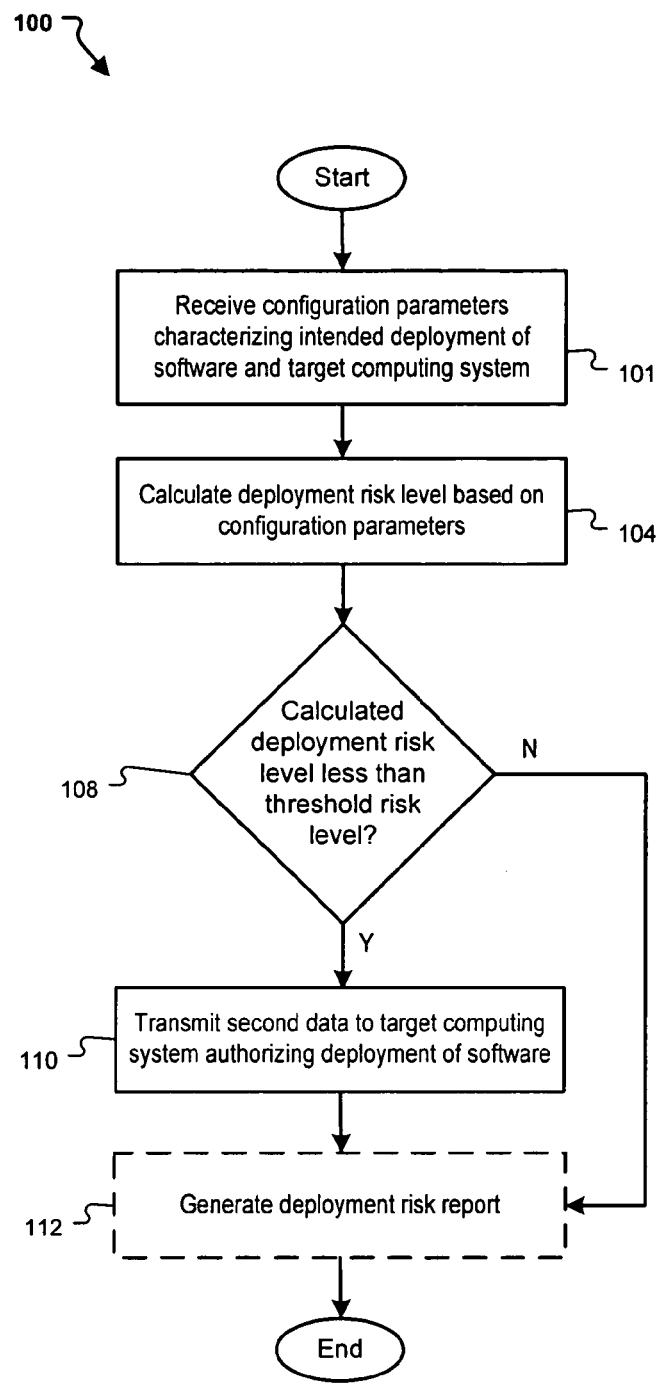
FIG. 1A is a flow diagram illustrating a method of deploying software based on a calculated deployment risk level, according to some implementations.
Figure 1B:
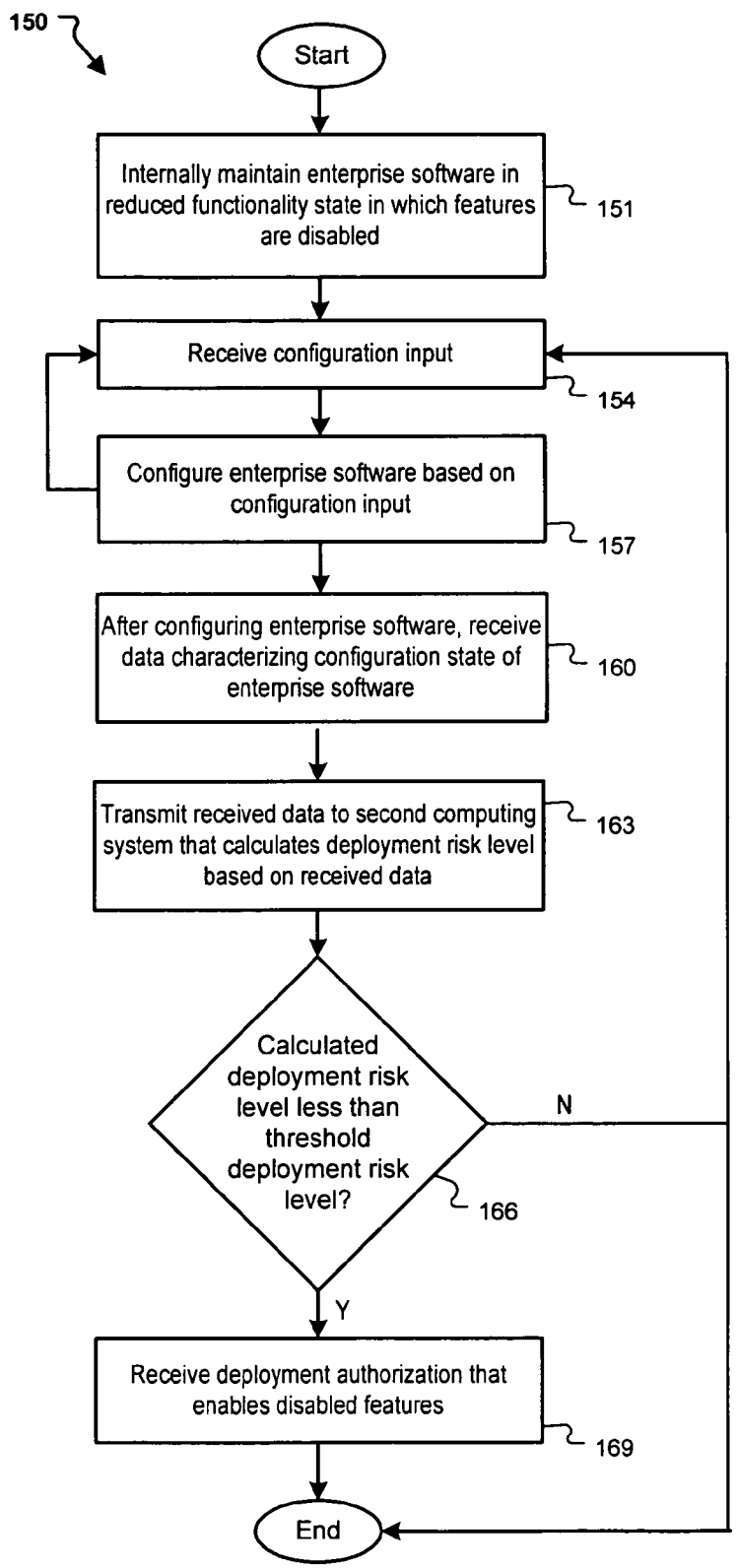
FIG. 1B is a flow diagram illustrating another method of deploying software based on a calculated deployment risk level, according to some implementations.

This document describes systems and techniques for deploying software based on a calculated deployment risk level. In general, the chance of success for deployment of a large software package, such as an ERP system, may be increased by rigorously holding a project back until certain known risks are addressed. Moving forward with a large software deployment without adequately addressing risks may cause the project to fail. Failure increases costs of both the software customer (untapped or under-tapped investment) and the software provider (increased support costs, loss of goodwill in the marketplace). Two points may be particularly critical in the timeline of many large software deployments: the early planning stages, before an organization begins installing or configuring software; and the launch period, during which time many projects go from "pilot stage" to "production stage." Addressing risks at these two points may significantly increase the success of a software deployment. FIG. 1A illustrates a method of addressing risk at the first critical point, before an organization begins installing software. FIG. 1B illustrates a method of addressing risk at the second critical point, before an organization launches a pilot implementation to "production."

FIG. 1A is a flow diagram illustrating a method 100 of deploying software based on a calculated deployment risk level, according to some implementations. In some implementations, the method 100 may be implemented by a software provider's computer hardware and software, or by the computer hardware and software of a third party that functions as a "gatekeeper" to a software customer's deployment project.

The method 100 receives, at 101, configuration parameters characterizing an intended deployment of software and further characterizing a target computing system from which the software is to be deployed. The configuration parameters may cover many different aspects of the intended software deployment—what will be deployed, who will deploy it, what hardware the system will be deployed on, how the software will be used once it is deployed, etc. More specific examples of configuration parameters are now provided.

In some implementations, configuration parameters may include a number of information technology (IT) personnel who are slated to deploy the software and appropriate credentials of one or more of the IT personnel. Both the number of IT personnel internal to the organization deploying the software and the number of external IT personnel (e.g., hired consultants) may be relevant. Industry recognized training may also be relevant. For example, for ERP deployments, it may be advantageous to have IT personnel available who have either CNERPS (Certified Novice of Enterprise Planning Systems) certification or CIERP (Certified Implementer of Enterprise Resource Planning) certification. It may also be advantageous to have IT personnel who are members of developing networks of one or more ERP vendors (e.g., the SDN-SAP developer network). Moreover, basic networking certification may be advantageous, such as, for example, CCIP (Cisco Certified Internetwork Professional) certification. As will be described in more detail below, this information may be used to address risks of a project. For example, certain "typical" software deployments (e.g., "a CRM system for a 100 million dollar company with 50 users") may have recommended thresholds for numbers and training/certification status of the IT personnel (e.g., minimum recommended IT staff: "three internal CCIP certified network administrators, two outside consultants with CIERP certification").

As another example, configuration parameters may include hardware specifications. Various parameters may be relevant to risk analysis of a software deployment. For example, a high level description of a network in terms of numbers of servers, numbers of client devices and operating systems on both servers and client devices may be relevant. More technical details may also be relevant, such as, processor type (e.g., dual processor, single processor, Intel® Pentium D®, Intel® Itanium®2, AMD Opteron™, etc.), processor speed, memory type and speed (e.g., 16 GB ECC DDR-2 SDRAM {error checking and correcting, double data rate-2, synchronous dynamic random access memory}, 800 MHz 2 MB L2 cache, etc.), and a description of networking components (Gigabit Ethernet routers, T1 back haul line, etc.).

As another example, configuration parameters may include estimated load on deployed software (e.g., 250 users, 10,000 hits/day, etc.). More technically, an estimated number of database tables may also be relevant (10-100's, 100-1, 000's, etc.), or an average database size in number of rows (10,000's, 10-100's of millions) or an average database size in bytes (10's of MB, 10's of GB), or maximum values for various database table parameters.

After receiving configuration parameters, at 101, the method 100 calculates, at 104, a deployment risk level based on configuration parameters. The calculation may factor all types of configuration parameters. For example, a calculation may take into account IT personnel available to deploy software, hardware specifications for the computing hardware on which the software will be deployed, estimated load on the deployed system, and other factors. Configuration parameters of varying types as described above may all play a role in the likelihood of success of a software deployment. For example, to regularly process large tables, a system may require minimum allowance of memory. To efficiently support certain numbers of users, network throughput may be a consideration.

The method 100 determines, at 108, whether the calculated deployment risk level is less than a threshold risk level. In some implementations, the threshold risk level may be a risk level that has been established statistically or through experience to be a reasonable threshold of risk in a large software deployment. For example, an enterprise software provider may have determined, based on experience in assisting thousands of customers in implementing ERP systems, that certain hardware, software, or implementation risks are high enough to warrant holding back a project. The threshold deployment risk level may reflect such experience.

If the calculated deployment risk level is below the threshold risk level, the method 100 may transmit, at 110, second data to the target computing system to authorize deployment of the software. The second data may take various forms. For example, in some implementations, the second data may be an authorization code that allows a functional copy of the software to be installed in a computing system. In some implementations, the second data may include the software itself. For example, a software provider may only release copies of software when a corresponding deployment risk level is below a threshold deployment risk level. In some implementations, limited-functionality software may be installed, but full functionality may not be available until a deployment risk level is sufficiently low, at which point the second data may enable previously disabled features of the software.

Optionally, the method 100 may generate, at 112, a deployment risk report based on the calculated deployment risk level. In some implementations, the deployment risk report may be generated regardless of the level of the calculated deployment risk. In some implementations, the deployment risk report may explain how the deployment risk level calculations were made and may further identify specific actions that may be taken to reduce the calculated deployment risk. For example, a calculated deployment risk level may be high because of particular high-failure rate hardware components in the system. The optional risk report may identify these hardware components as sources of the high calculated risk and may further recommend their replacement.

FIG. 1B is a flow diagram of a method 150 of deploying software based on a calculated deployment risk level, according to some implementations. In some implementations, the method 150 may be implemented primarily on a client computer device, while the actual deployment risk calculation may be performed on another computing system (e.g., a computing system maintained by a corresponding software provider).

In some implementations, the method 150 is performed in a computing system on which at least portions of the software (e.g., enterprise software) to be deployed are already installed. However, the method 150 may maintain, at 151, the enterprise software in a reduced functionality state in which certain features are disabled or in which the software has limitations that are not present in a "production-released" version of the software. The reduced functionality state may be appropriate for a "pilot system" during a configuration phase of the deployment.

The method 150 receives configuration input, at 154, to configure the enterprise software. Configuration input may relate to installation of different software modules, hardware configurations, software setting customizations, user interface creation or configuration, or to other configurations that are common in an ERP implementation. In response to the configuration, the method 150 configures the ERP, at 157, as specified by the configuration input.

After configuring the enterprise software in one or more ways, the method 150 receives, at 160, data characterizing a configuration state of the enterprise software. In some implementations, at least a portion of the data may be received as user input. In some implementations, at least a portion of the data may be collected automatically, as configuration input is received, at 154, and as the enterprise software is configured, at 157, based on the configuration input. In some implementations, the data is received continuously, or at least periodically, as the system is configured. In some implementations, configuration state is integrated by a software process at one point in time, or a portion of the configuration state is provided by user input at one point in time (e.g., through a form).

However the data characterizing configuration state is gathered, it is, at some point transmitted, at 163, to a second computing system that calculates a deployment risk level based on the data. In some implementations, the second computing system is that of a software provider (e.g., an ERP software provider, such as SAP AG). In some implementations, the second computing system is maintained by a third party service provider, such as a software consulting company, that functions as a "gatekeeper" to the software consumer's deployment project. Based on the data transmitted to it, the second computing system calculates, at 166, a deployment risk level in the manner described with reference to FIG. 1A above, and determines whether the calculated deployment risk level is less than a threshold risk level.

If the calculated deployment risk level is higher than or equal to a threshold deployment risk level, the method 150 may continue receiving configuration input, at 154, and may continue configuring the enterprise software, at 152. At a later time, data characterizing the configuration state of the enterprise software may again be received, at 160, and the received data may be transmitted, at 163, to the second computing system for recalculation of the deployment risk and comparison, at 166, with the threshold risk level.

If the calculated deployment risk is lower than a threshold deployment risk level, the method 150 may receive, at 169, from the second computing system, authorization that causes one or more of the previously disabled features to be enabled. In some implementations, the authorization may enable a software deployment to transition from a "pilot phase" to a full featured "production phase." In some implementations, the authorization may only allow the software deployment to progress incrementally.

Figure 2:
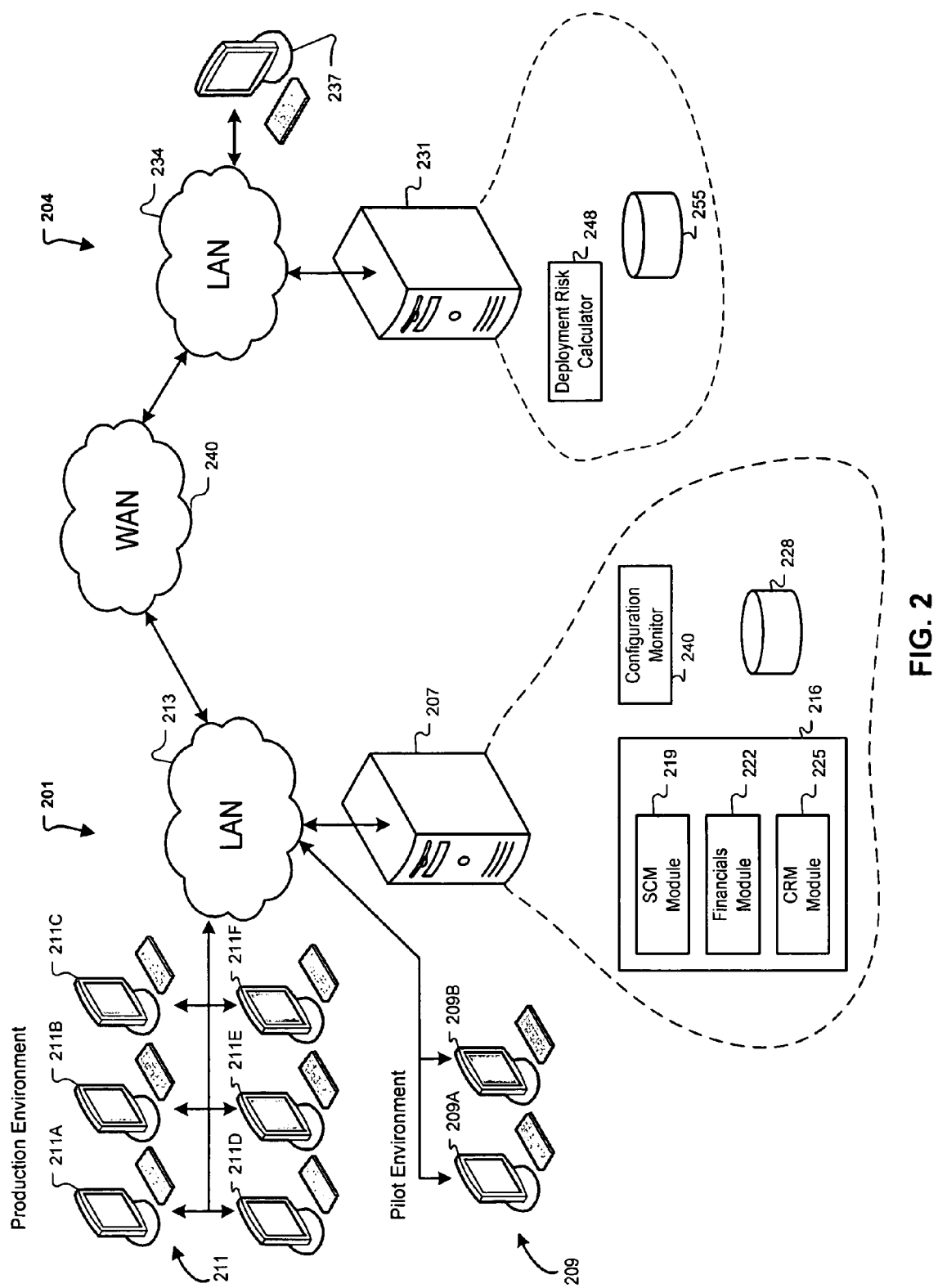
FIG. 2 is a block diagram of computing system in which the methods illustrated with reference to FIG. 1A or FIG. 1B may be implemented, according to some implementations.

FIG. 2 is a block diagram of first computing system 201 and a second computing system 204 in which the methods 100 and 150 that were described with reference to FIG. 1A and FIG. 1B may be implemented. As shown, the first computing system 201 includes at least one server device 207, a plurality of client devices 209 and 211, and a network 213, such a local area network (LAN), that couples the client devices 209 and 211 and the server 207. The first computing system 201 may represent an organization's computing infrastructure. As shown, the second computing system 204 also includes at least one server device 231, a LAN 234, and at least one client computer device 237. The second computing system 204 may represent a portion of a software provider's computing infrastructure.

The second computing system 204 and the first computing system 201 may be coupled by a network 240, such as a wide area network (WAN) (e.g., the Internet). Through the networks 213, 240 and 234, various devices 209 and 211 in the first computing system 201 may communicate with one or more devices in the second computing system 204.

In some implementations, the server device 207 may run an organization's enterprise computing software that may be accessed from the various client devices 211. For example, the server device 207 may run ERP software 216 that includes an SCM module 219 that may be accessible from a Purchasing Department computer device (e.g., computer device 211A), a financials module 222 accessible from an Accounting Department computer device (e.g., computer device 211B), and a CRM module 225 accessible from a Marketing/Sales Department computer device (e.g., computer device 211C). The ERP software 216 may cause the server device 207 to maintain a database 228 for storing data associated with the various modules 219, 222 and 225 of the ERP software 216. For example, the ERP software 216 may cause the server device 207 to store sales orders entered by a user of the computer device 211C, or financial data entered by a user of the computer device 211B, or purchase orders for parts, entered by a user of the computer devices 211A. The data in the database 228 may be accessible by multiple software modules, and data may be interrelated. For example, upon receipt of a sales order from the CRM module 225, the ERP software 216 may store an entry in an "accounts receivable" data field associated with the financials module 222.

In some implementations, the second computing system 204 is a software provider, such as the provider of the ERP software 216, or of one or more of the ERP modules 219, 222 or 225. In some implementations, a third-party service provider, such as a consulting service provider, maintains the second computing system 204. In any case, the second computing system 204 may be configured to receive information from the first computing system 201, and to provide one or more support services in response to the received information. One such support service may include calculating a deployment risk level associated with deployment of a software package and authorizing deployment if the calculated deployment risk level is sufficiently low. Calculating deployment risk is now explained from the perspective of starting with a small computing system and deploying the system 201 that is shown in FIG. 2.

Initially, the computing system 201 may have started as a smaller network than what is shown in FIG. 2. For example, the computing system 201 may have started as only a server device 107 and a single client device 209B. Over time, the computing system 201 may have grown. A system administrator may have considered deploying a software package such as the ERP package 216, with an SCM module 219, a financials module 222 and a CRM module. The system administrator may have contacted a software provider, such as the software provider 204, to obtain the ERP package 216.

Before providing the system administrator with software to try installing on the computing system 201, the software provider 204 may have required the system administrator to run a tool to initially assess deployment risk associated with installing the ERP software 216 in the computing system 201. The tool may have implemented the method 100. For example, a configuration monitor 240 in the computing system may have automatically collected various configuration parameters associated with the computing system 201. The configuration monitor may have transmitted the various configuration parameters to a deployment risk calculator 248 in the second computing system 204. The deployment risk calculator 248 may have calculated a deployment risk level based solely on the automatically collected configuration parameters. Assuming the calculated deployment risk level was relatively low, the second computing system 204 may have transmitted data to the target computing system 201 authorizing initial deployment of the software. For example, the initial authorization may have enabled the ERP package to be installed on the server device 207 for use within a pilot environment 209.

The pilot environment 209 may have only included the client devices 209A and 209B. Within the pilot environment 209, the system administrator, possibly with a team of consultants and IT professionals, may have configured various aspects of the ERP system for use in the computing system 201. For example, the ERP system may have been configured to work with the server device 207 and database 228, and various customized interfaces may have been created for the SCM module, the financials module and the CRM module within the pilot environment.

Once the system was robustly configured for the pilot environment 209, the system administrator and team of consultants may have planned for a production release of the software to the production environment 211. Before releasing the ERP package 216 for production, the service provider 204 may have required additional deployment risk calculations. The service provider 204 may have required the computing system 201 to implement the method 150.

During the configuration process, the ERP software 216 may have been initially maintained in a reduced functionality state, with certain features disabled. During the configuration process, the configuration monitor 240 may have captured various data that characterized the configuration state of the enterprise software. In preparation for production release, the data characterizing the configuration state of the enterprise software may have been transmitted to the deployment risk calculator 248.

The deployment risk calculator 248 may have calculated a deployment risk level associated with the configuration state data. The calculated deployment risk level may have been compared to a threshold deployment risk level. The threshold deployment risk level may have been determined based on data the service provider had previously collected, analyzed and stored (e.g., in the database 255). If the calculated deployment risk level was sufficiently low, the computing system 205 may have sent authorization to the first computing system 201, which, for example, may have enabled the ERP software 216 to be released from the reduced-functionality pilot environment, to the fully functional production environment.

Figure 3:
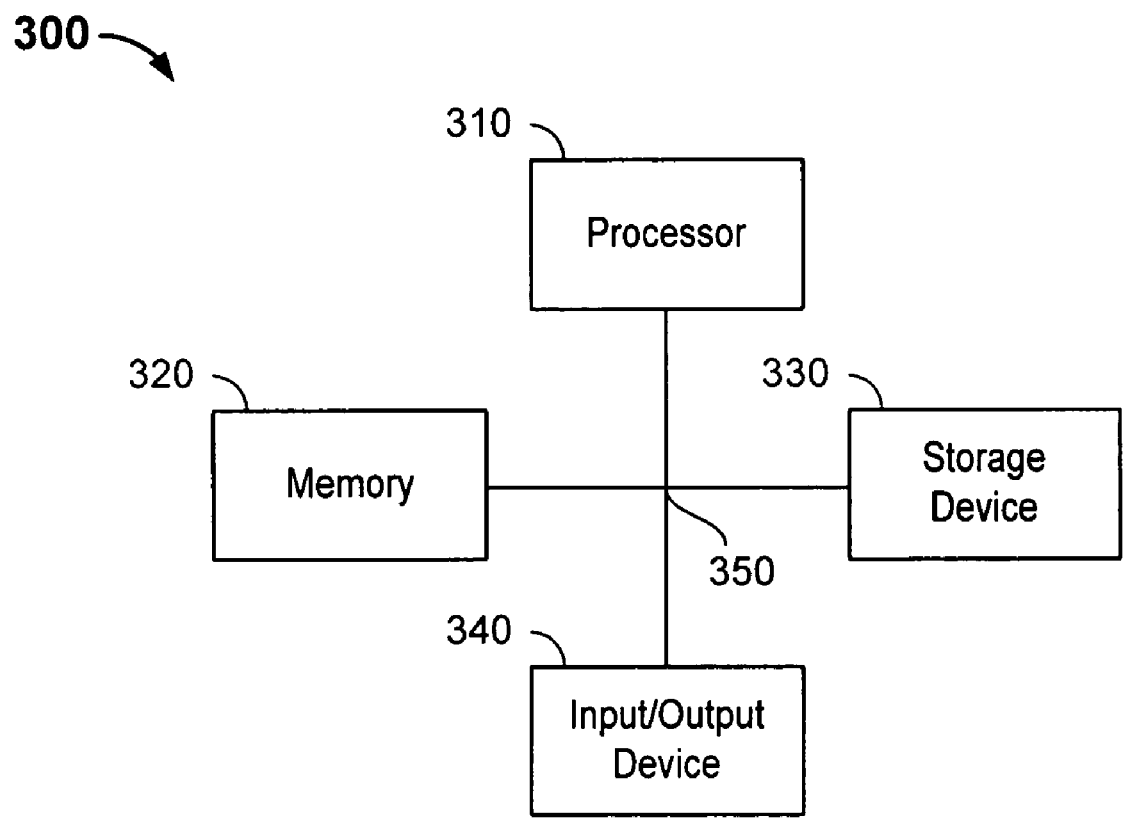
FIG. 3 is a block diagram of a computer device that may be used in the systems and methods described herein, according to some implementations.

FIG. 3 is a block diagram of a computer device 300 that may be used in the operations described above, according to some implementations. The computer device 300 includes a processor 310, a memory 320, a storage device 330 and an input/output device 340. Each of the components 310, 320, 330 and 340 are interconnected using a system bus 350.

The processor 310 is capable of processing instructions for execution within the computer device 300. In some implementations, the processor 310 is a single-threaded processor. In other implementations, the processor 310 is a multi-threaded processor. The processor 310 is capable of processing instructions stored in the memory 320 or on the storage device 330 to display graphical information for a user interface on the input/output device 340.

The memory 320 stores information within the computer device 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the computer device 300. In some implementations, the storage device 330 is a computer-readable medium. In various other implementations, the storage device 330 may be a floppy disk device, a hard disk device, an optical disk device, or a tape device.

The input/output device 340 provides input/output operations for the computer device 300. In some implementations, the input/output device 340 includes a keyboard and/or pointing device. In some implementations, the input/output device 340 includes a display unit for displaying graphical user interfaces.

FIGS. 4, 5, 6A and 6B illustrate screenshots of a user interface that may be used to implement a method of initially deploying software based on a calculated deployment risk level, according to some implementations. The methods illustrated in these figures may be used to address risk before an organization begins installing or configuring software during a "pilot phase." The screenshots illustrate a check that may be referred to as a "Project Check," and that may correspond to the method 100.

Figure 4:
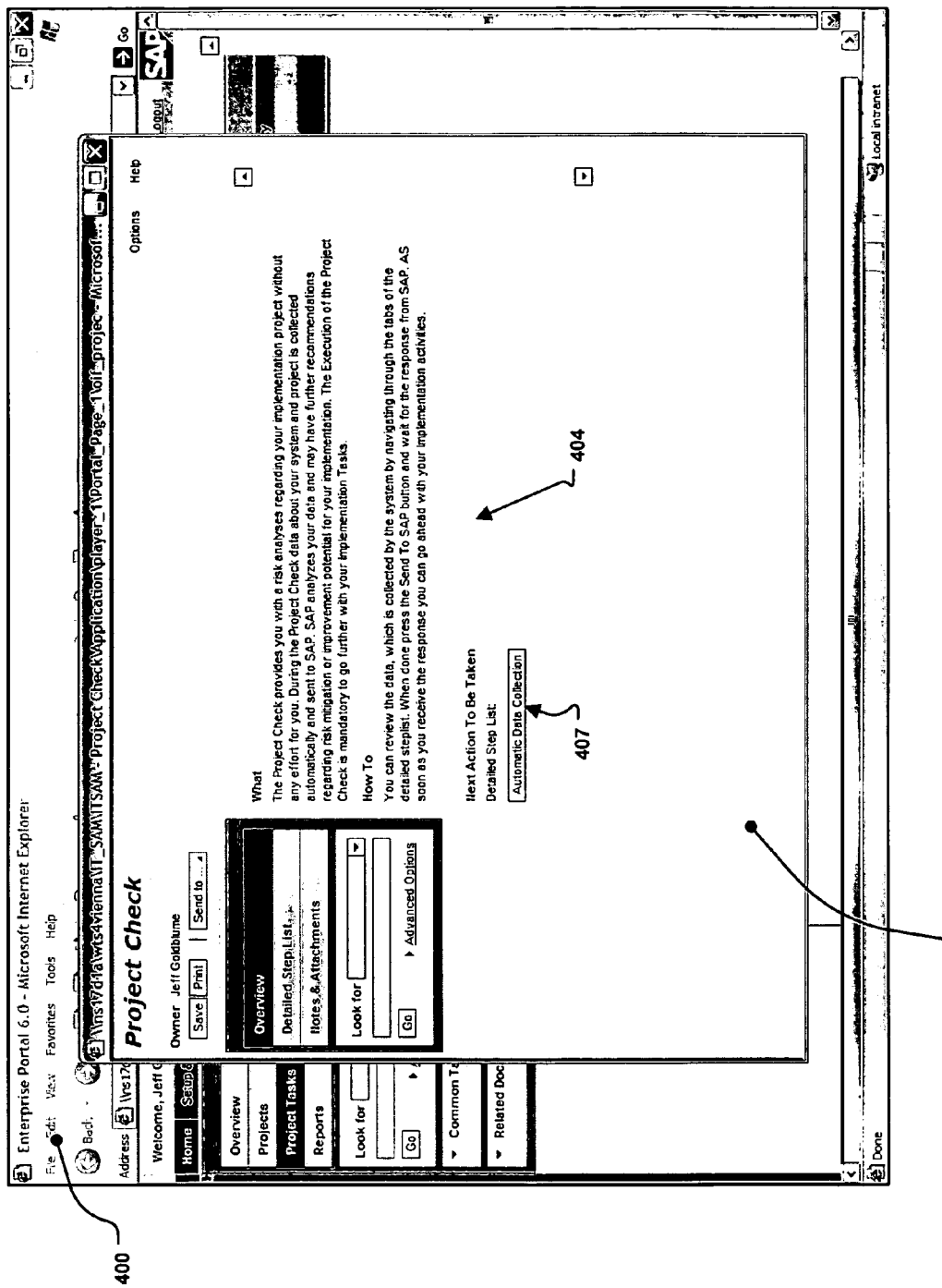
FIGS. 4, 5, 6A and 6B are screenshots illustrating a user interface that may be used to implement a method of initially deploying software based on a calculated deployment risk level, according to some implementations.

FIG. 4 illustrates an existing SAP portal environment 400 within which is provided a "Project Check" user interface (UI) 401. In some implementations, smaller projects may be added to an existing system that may include various enterprise software components, such as a portal environment 400. In some implementations, the Project Check UI may be available outside of an existing portal environment, such as, for example, in the environment of an organization that is just starting to specify its hardware and software systems. As shown, the Project Check UI provides information 404 about the Project Check itself—how data will be collected, what opportunities a user will have to review data that is collected, where the data will be sent once it is collected, etc. The Project Check UI also provides a control 407 that the user can select to initiate the Project Check. As shown, initiation of the "Automatic Data Collection" with the control 407 will cause the underlying system to collect various system information for use in the Project Check. As was described with reference to FIG. 1A, this information may include various hardware, software and operating system parameters that the Project Check may analyze in assessing initial deployment risk.

Although not shown in FIG. 4, a Project Check may receive input from a user to specify a specific intended software deployment (e.g., a CRM module, or a comprehensive ERP module like mySAP All-in-One); when a specific intended software deployment is specified, the Project Check may analyze system parameters specifically for that deployment. In the absence of a specific intended deployment, the Project Check may identify general vulnerabilities that may impede the deployment of enterprise or other large software packages in general.

Figure 5:
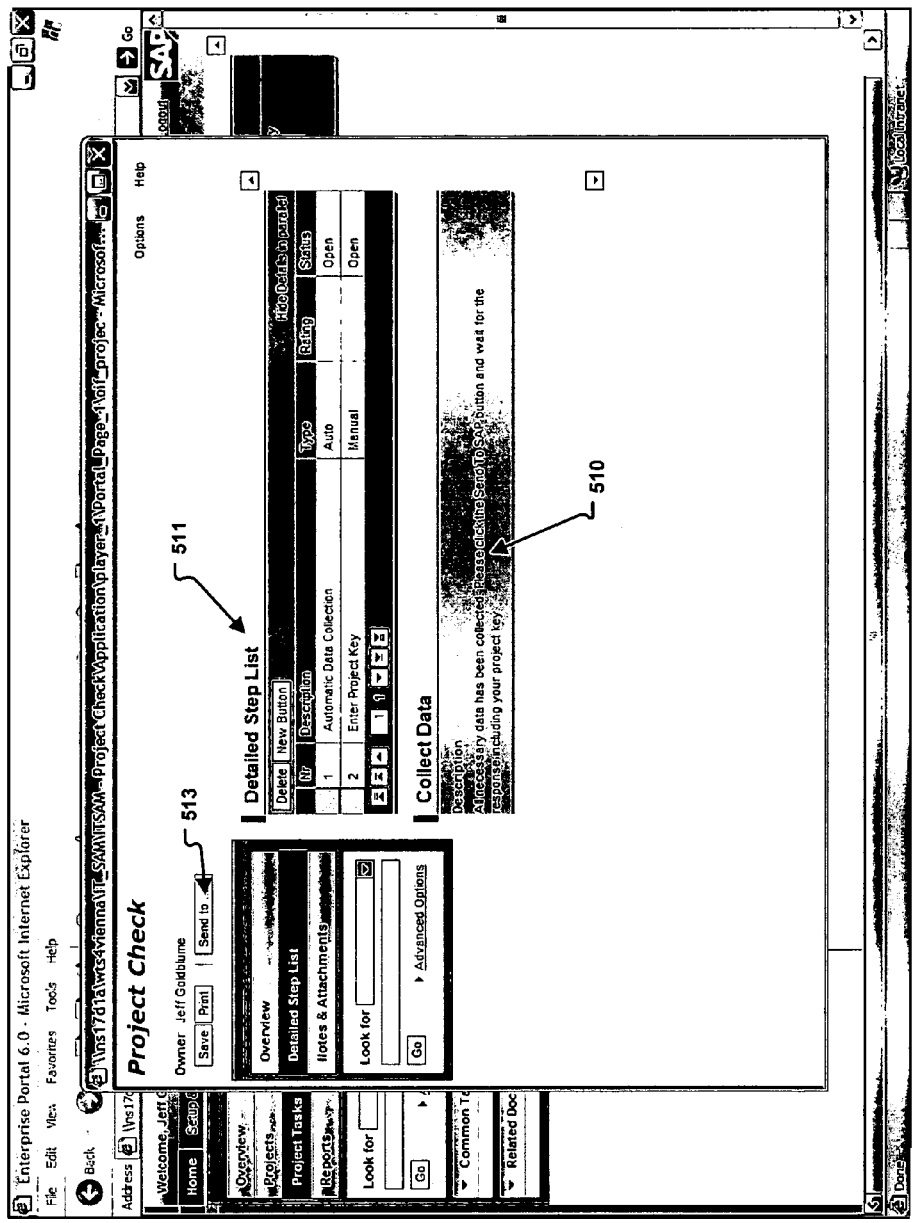

In the UI that is illustrated, selection of the control 407 causes the system to automatically gather system information and to bring up the screen that is shown in FIG. 5. As shown, an indication 510 is provided that necessary data has been collected. The user is provided with a list 511 of activities that are pending in the Project Check, and the user is invited to submit the collected data to the software provider (SAP, in this case) by selecting the control 513.

Figure 6A:
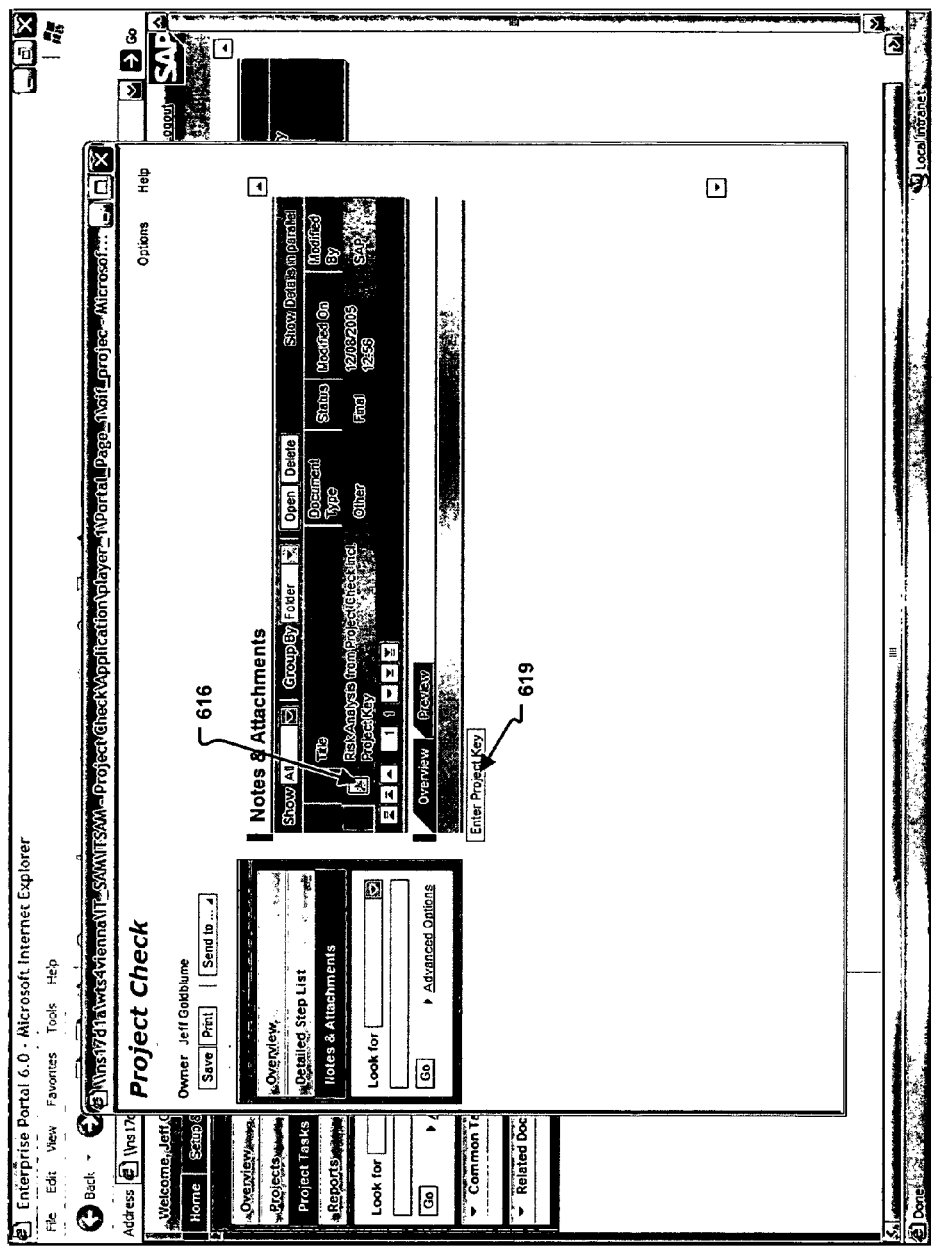
Figure 6B:
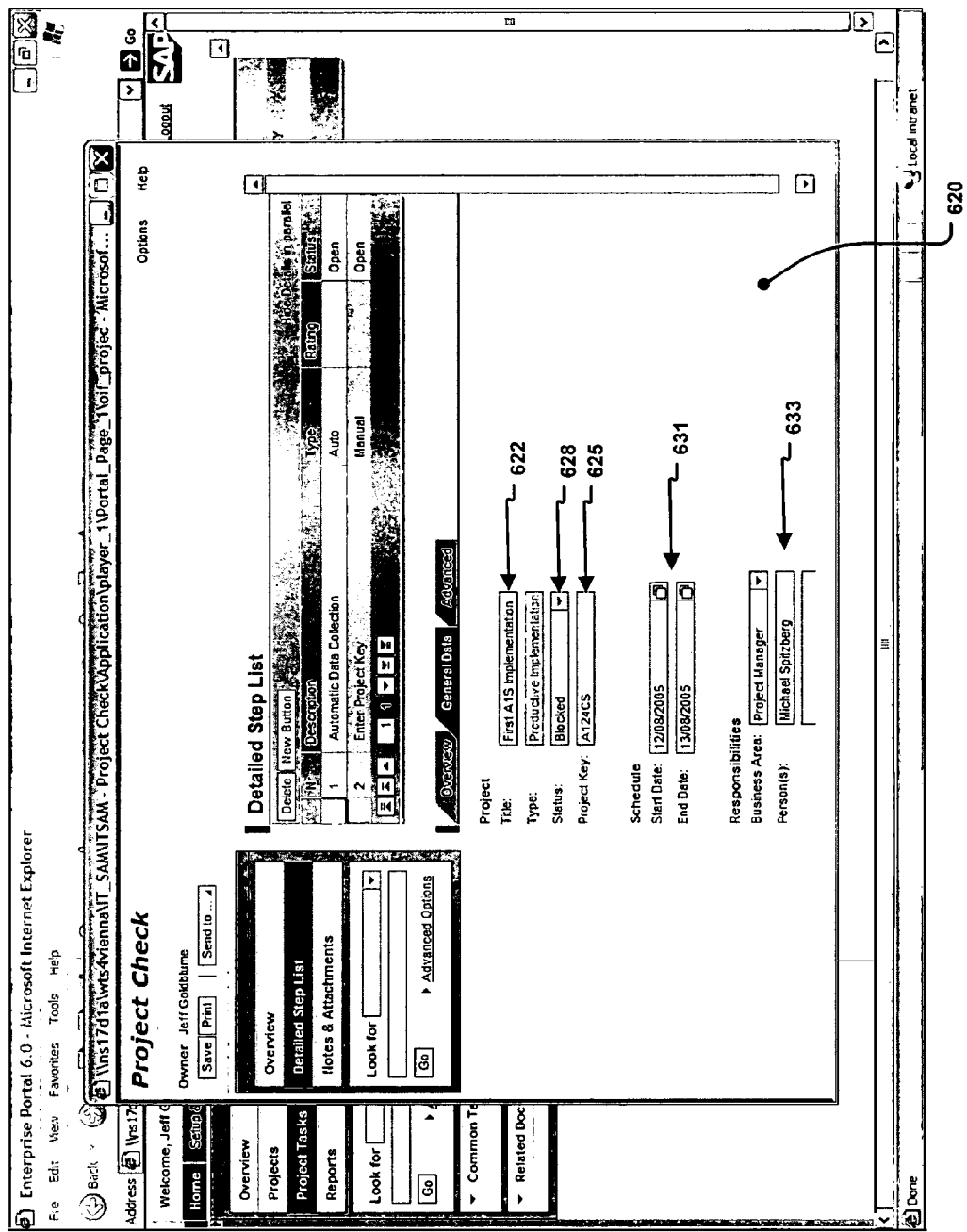

Selection of the control 513 causes the collected data to be sent to SAP and brings up the screen that is displayed in FIG. 6A. As shown, the Project Check provides a risk analysis report 616, which, in this case, includes a project key. In some implementations, inclusion of a project key in a risk assessment report indicates that no significant deployment risks were identified at this stage in a project and the software customer is free to initiate deployment of software.

In some implementations, a project key may not be provided if the Project Check identifies risks that should be addressed before proceeding. For example, the Project Check may identify a faulty piece of hardware (e.g., a network router or a server memory card) that should be replaced prior to beginning to deploy new software. The Project Check may withhold the project key until it confirms that the faulty piece of hardware has been replaced. In some implementations, the project key is provided in some other manner, such as by email or fax or on a CD or in the form of a hardware key. A risk assessment report may or may not be provided. When it is provided, a risk assessment report may describe how a deployment risk level is calculated and to what baseline it is compared. Moreover, a risk assessment report may include suggestions of specific steps that a user can take to reduce risk. For example, the risk assessment report may provide a list of hardware or software upgrades that would most significantly improve a computing system and reduce risk associated with deploying a new software package.

As shown in FIG. 6A, the UI provides a user with the opportunity to enter a project key and begin deploying software. Upon selection of the Project Key control 619, another screen 620 is provided. On the screen 620, a user may enter the project key 625 and various other project information, such as for example, a title for the project 622, a status 628 of the project, a schedule 631, and project contacts 633.

FIGS. 7-12 illustrate screenshots of a user interface that may be used to implement a method of releasing software to a production phase, from a pilot phase. More particularly, the methods illustrated in these figures may address risk once an organization has begun installing or configuring software during a pilot phase. The screenshots illustrate a check that may be referred to as a "GoingLive Check," and the GoingLive Check may ensure that a system has been properly configured before it is released in unrestricted or less restricted format to a large group of users. The GoingLive Check may correspond to the method 150.

Figure 7:
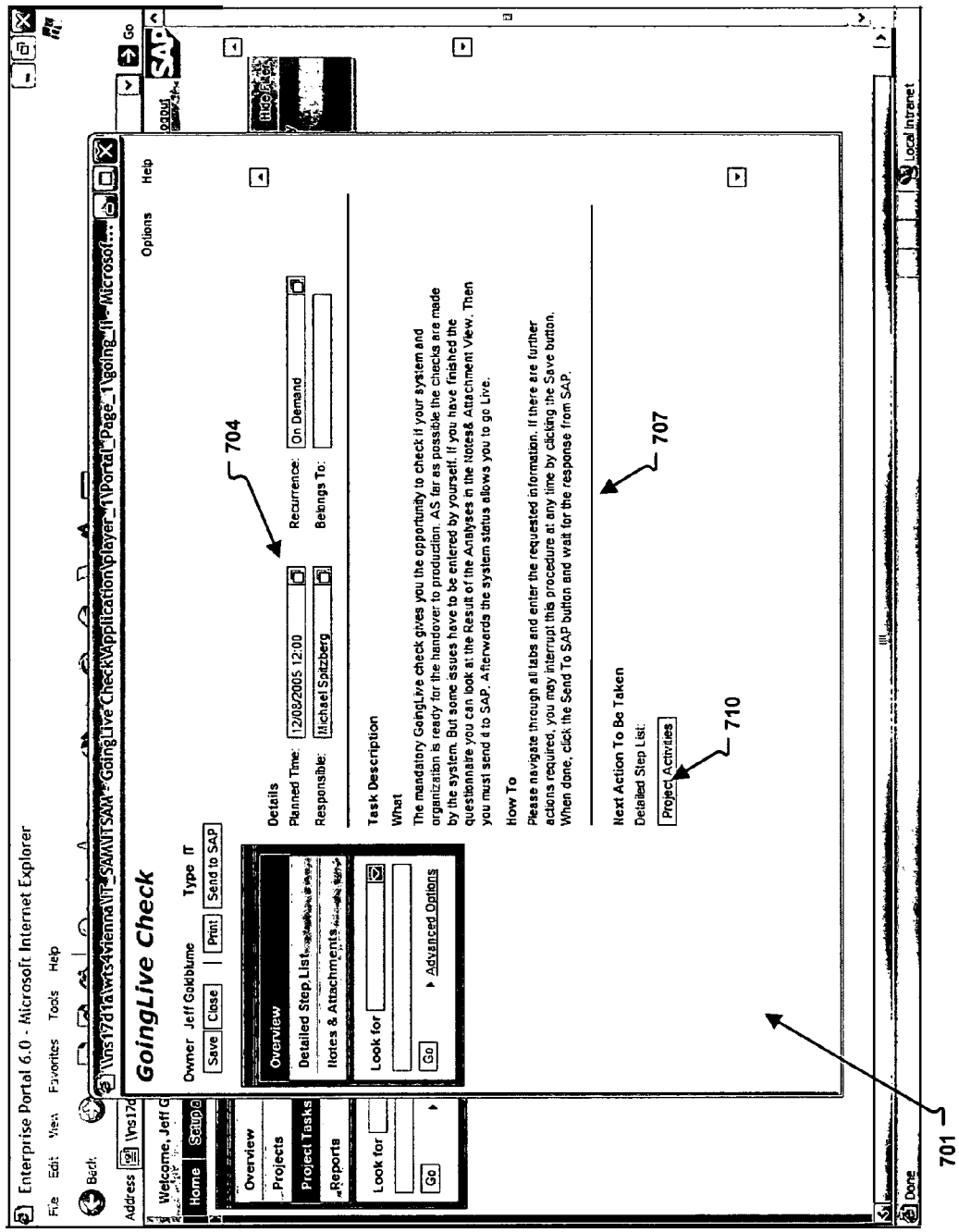
FIGS. 7-12 are screenshots illustrating a user interface that may be used to implement a method of releasing an enterprise software implementation to "production," from a "pilot phase," according to some implementations.

As illustrated in FIG. 7, a UI 701 may be provided through which a user interacts with the GoingLive Check. Similar to the Project Check, the GoingLive Check UI may provide information 707 about various steps involved in the GoingLive Check. As illustrated, the GoingLive Check may require various data to be submitted, including data that can be automatically gathered by the system and data that must be manually entered by a user. The GoingLive Check UI 701 may also include various project information 704, such as key project personnel and a project schedule. The UI 701 includes a control 710 that allows a user to initiate the GoingLive Check.

Figure 8:
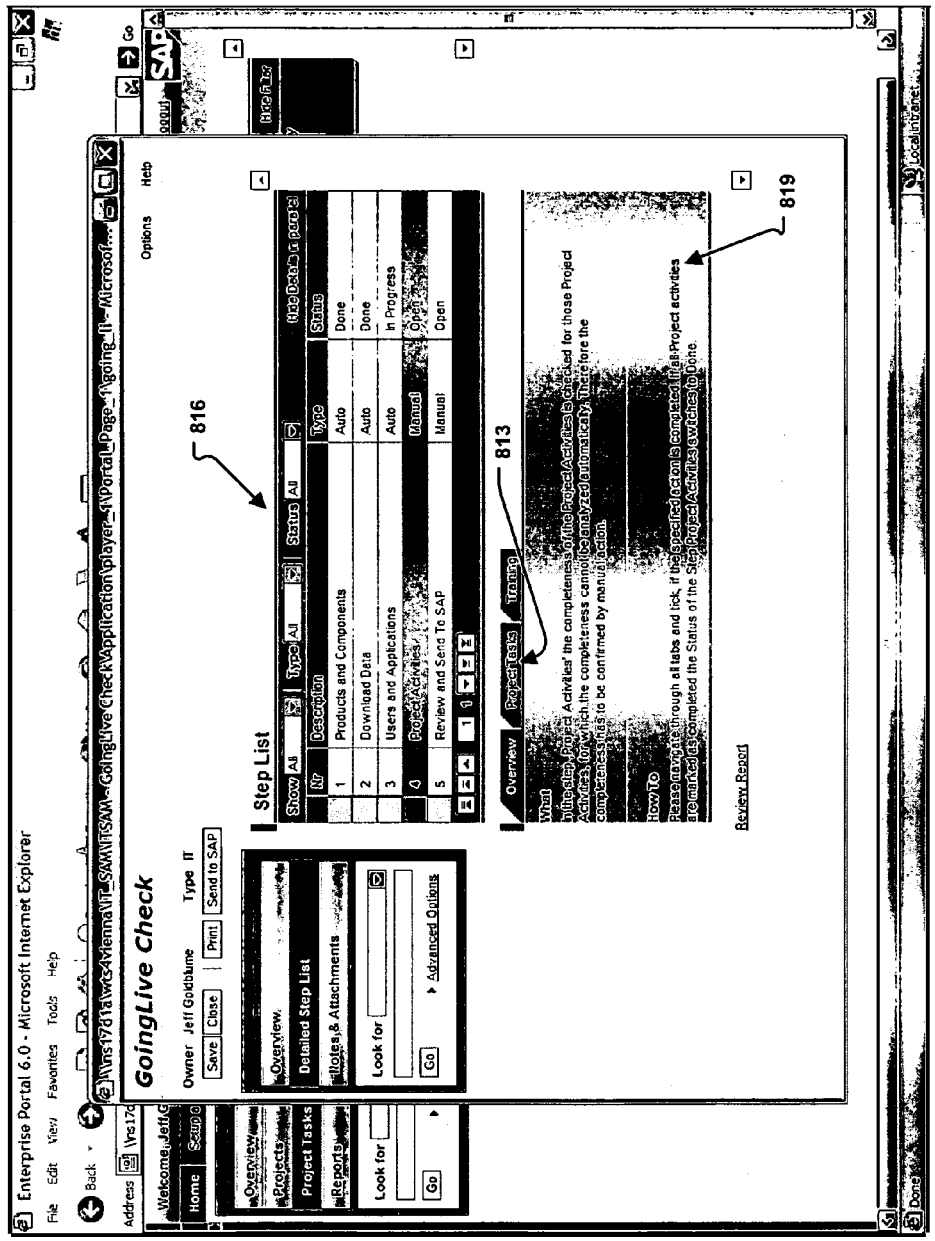

Upon selection of the control 710, the GoingLive check displays the interface that is shown in FIG. 8. As shown, the interface includes text-based information 819, and a list of steps 816 included in the GoingLive check, along with the status of those tasks and whether they can be automatically completed. The interface also provides controls, such as the tab 813, that allow a user to navigate through various stages of the GoingLive Check.

Figure 9:
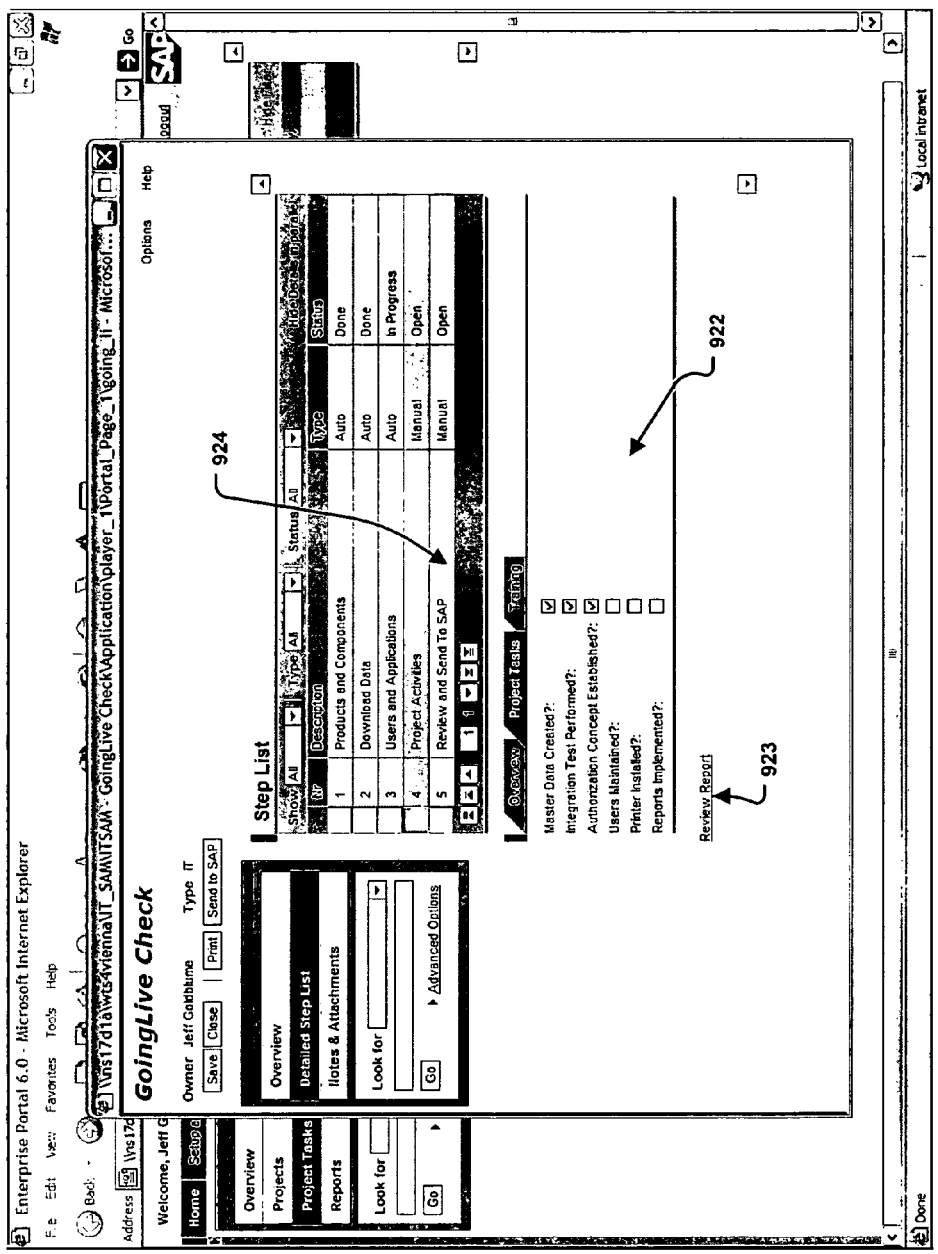

Upon selection of the tab 813, the GoingLive check displays the list 922 that is shown in FIG. 9. The list 922 may solicit specific responses from a user as to whether various configuration activities have been completed. In some implementations, the GoingLive Check may not release a deployment project to "production phase" until these configuration activities have been completed. Responses to the list entries 922 may be incorporated in a report that analyzes the readiness of a system to be released to production phase. In some implementations, readiness may be a function of a calculated deployment risk relative to a predefined threshold deployment risk. The report may be available to users for review via the control 923. A user may be able to advance the GoingLive Check by selecting the next step 924 in the step list.

Figure 10:
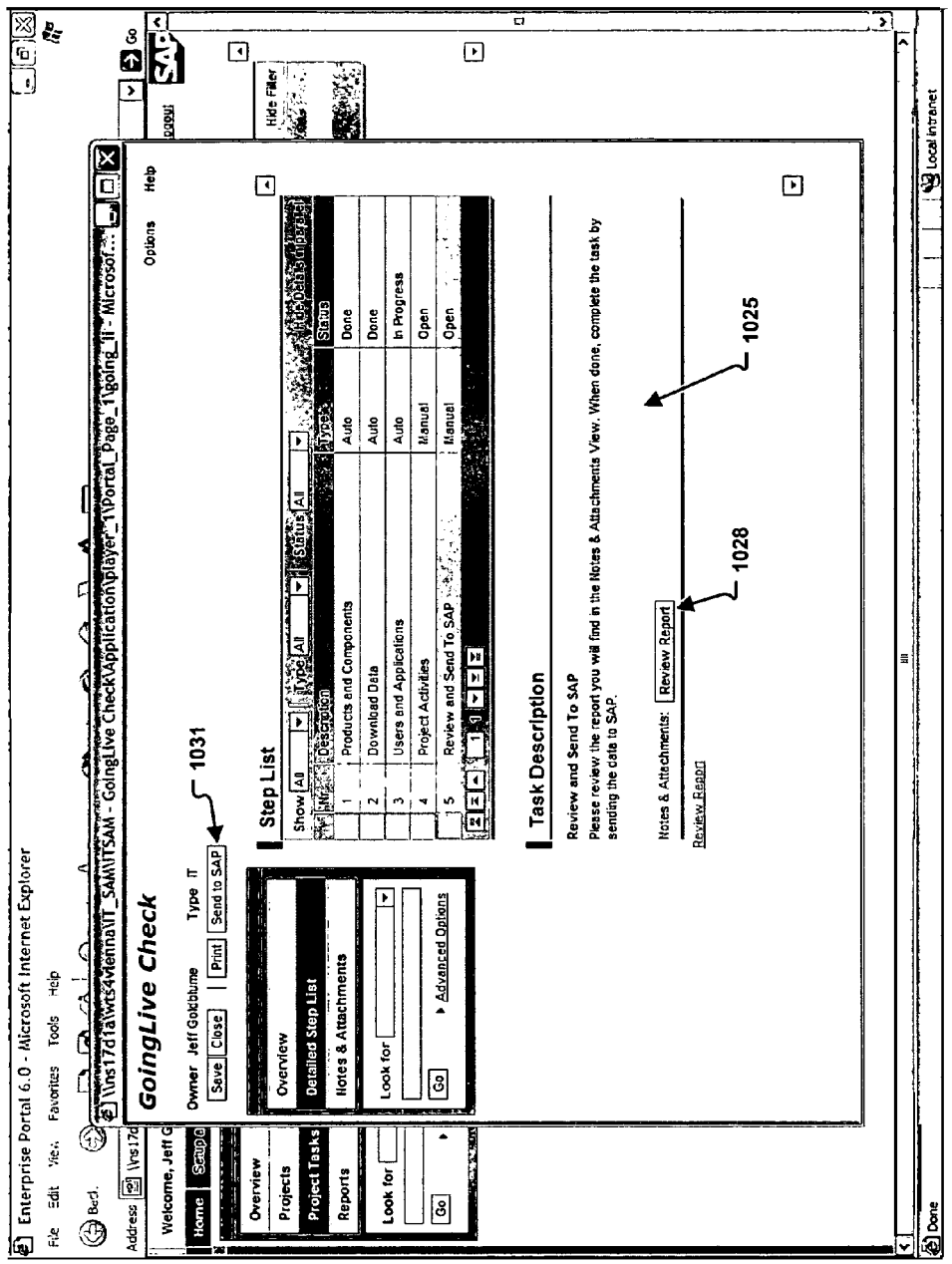

Upon selection of the step 924, the GoingLive Check displays the interface that is shown in FIG. 10. The interface displays additional text information 1025, provides a user with another control 1028 to review a GoingLive report. The interface invites the user to submit the GoingLive information to SAP, via the control 1031, for further analysis. Upon selection of the control 1031, the interface may transmit automatically collected information and user-submitted information to SAP for analysis. Based on this transmitted information, SAP may calculate a deployment risk level and compare this calculated deployment risk level with a threshold deployment risk level. Based on the comparison, SAP may allow the system to be deployed in a production phase, or SAP may withhold this authorization in order to minimize risk associated with deploying the system in its current state.

Figure 11:
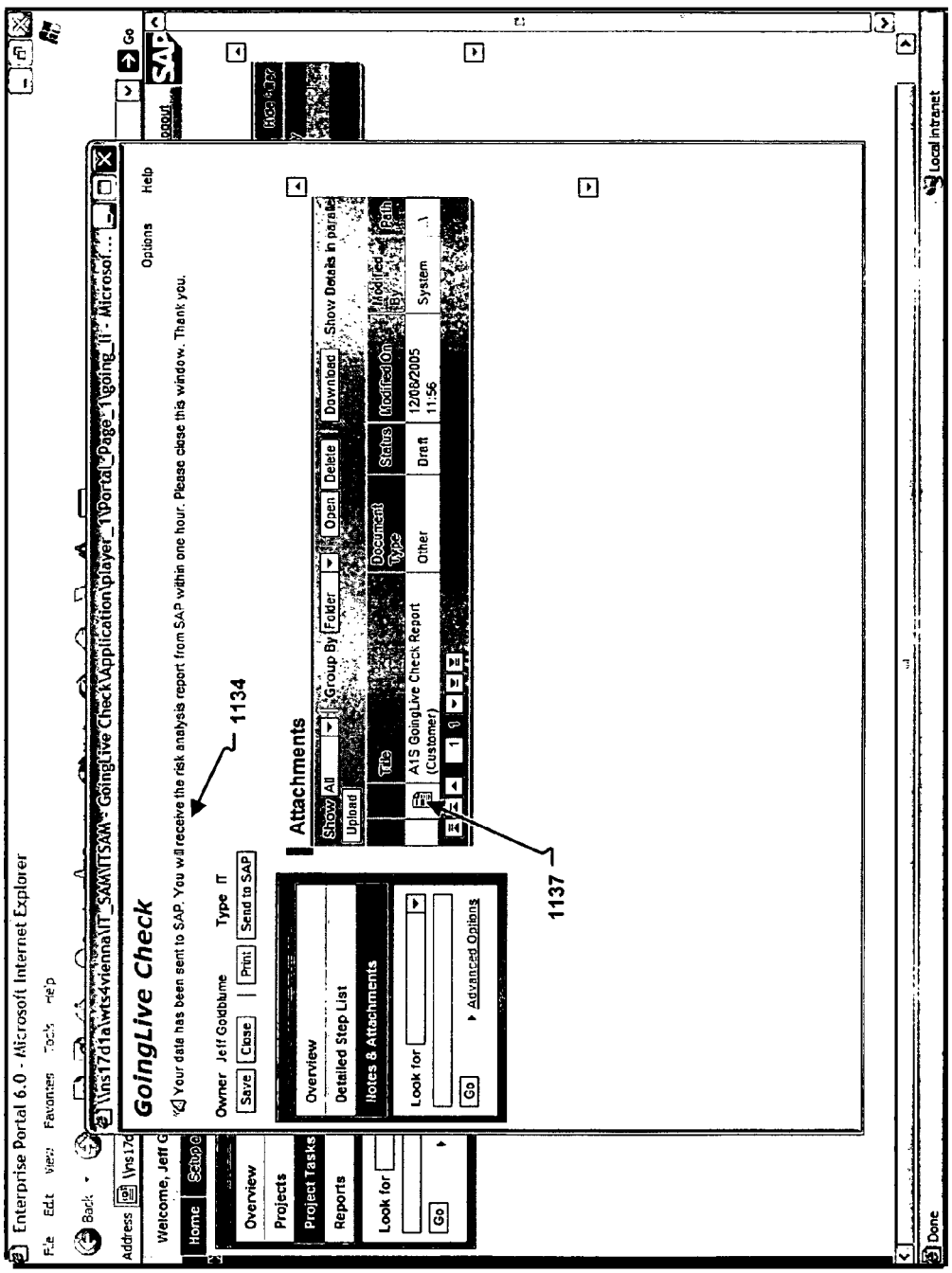

The transmission of information and calculation of deployment risk may require some time. Thus, upon selection of the control 1031, the interface that is shown in FIG. 11 may be displayed. As shown by the message 1134, confirmation that data has been sent out for analysis is provided, along with an indication of when a completed analysis will be available. Also shown in FIG. 11 is a local copy of the GoingLive Report 1137 that was created by the local system.

Figure 12:
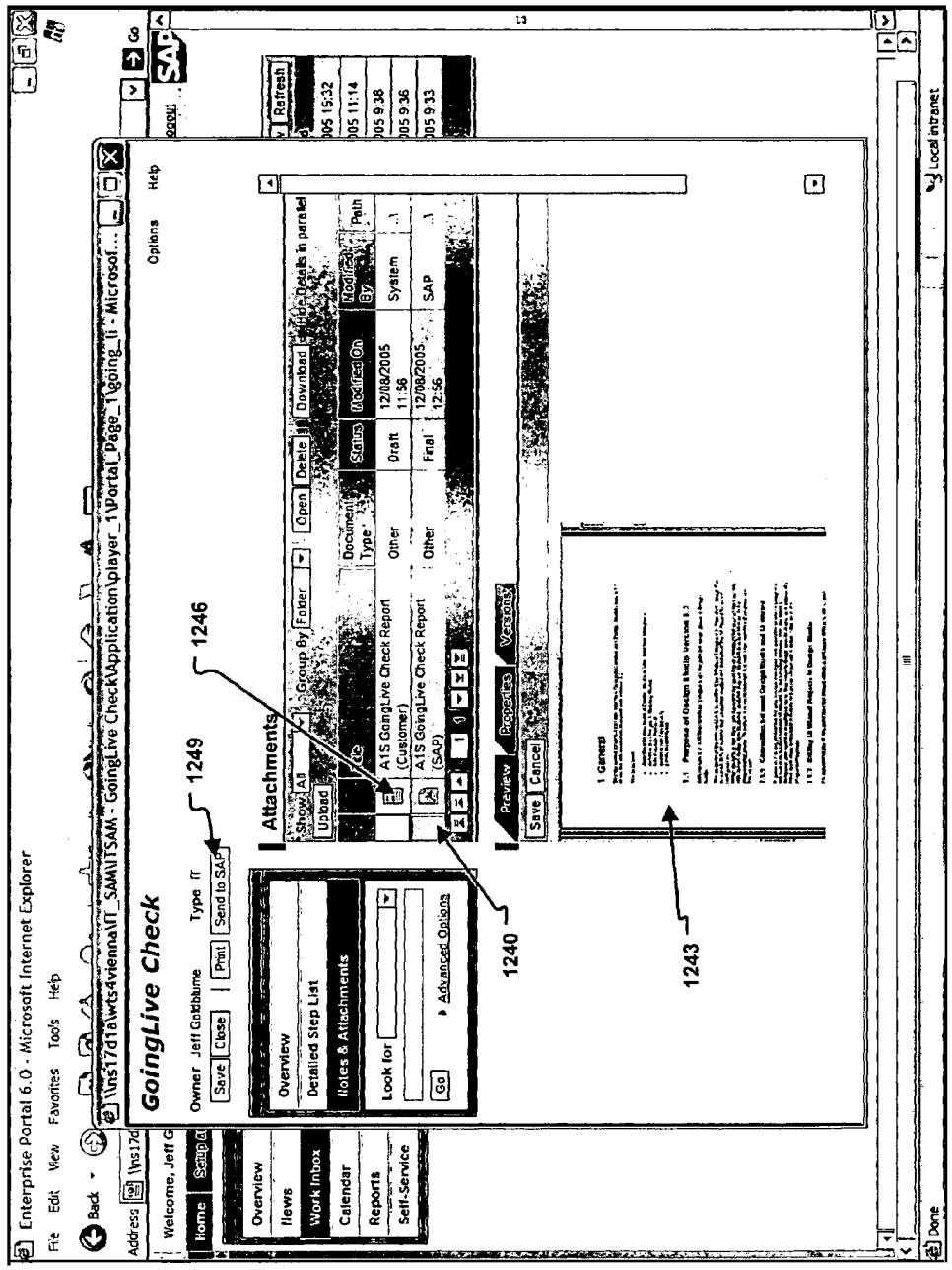

FIG. 12 illustrates the interface that appears once a completed analysis is provided by SAP to the local system. The interface again displays the original, local copy of the GoingLive Report 1246, and it also displays the SAP-generated analysis 1240. A copy of the analysis 1240 may be viewed in the preview pane 1243. The analysis may identify various risks associated with moving the corresponding system to a production phase, and the analysis may further provide specific suggestions for users to implement in order to reduce the deployment risk. Reviewing specific suggestions in the analysis, implementing some of the suggestions, and rerunning the GoingLive Check may be an iterative process until deployment risk is sufficiently low that a production release is authorized. To get to that point, a user may review the report 1243, implement recommended changes to the system, update any user-submitted data in the customer report 1246, and resubmit the data by selecting the control 1249. The user may repeat this process several times.

The foregoing FIGS. 4-12 are merely illustrative of interfaces that may be used to control deployment of software based on calculated deployment risk levels. Many other variations and functions are possible without departing from the scope of this disclosure.

The methods may be implemented in digital electronic circuitry, or in computer hardware, firmware, software, or in combinations of them. Apparatus may be implemented in a computer program product tangibly embodied in an information carrier, e.g., in a machine-readable storage device or in a propagated signal, for execution by a programmable processor; and actions of the method may be performed by a programmable processor executing a program of instructions to perform functions of the invention by operating on input data and generating output. Implementations may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, a computer device may include a display device such as a CRT (cathode ray tube) or LCD (liquid crystal display) monitor for displaying information to the user and a keyboard and a pointing device such as a mouse or a trackball by which the user may provide input to the computer.

Apparatus and methods disclosed herein may be implemented in a computer system that includes a back-end component, such as a data server; or that includes a middleware component, such as an application server or an Internet server; or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server may arise by virtue of computer programs running on the respective computers and having a client-server relationship to each other.

Implementations may include, at least in part, in hardware or software or in any combination thereof. Hardware may include, for example, analog, digital or mixed-signal circuitry, including discrete components, integrated circuits (ICs), or application-specific ICs (ASICs). Implementations may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing implementations described herein.

A number of implementations have been described. Nevertheless, it should be understood that various modifications may be made without departing from the scope of this disclosure. Accordingly, other implementations are within the scope of the following claims.

What is claimed is:

1. A computer-implemented method comprising:
   receiving, into memory, first data comprising at least one configuration parameter that characterizes an intended deployment of software and a target computer system on which the software is to be deployed, the at least one parameter describing i) performance capabilities of information technology personnel slated to deploy the software and ii) an estimated post-deployment load on the software based at least in part on predicted use of the software following deployment;
   calculating a pilot stage deployment risk level based on the first data including the performance capabilities of the information technology personnel relative a recommended performance capability for personnel deploying the software and the estimated post-deployment load on the software;
   determining whether the calculated pilot stage deployment risk level is less than a first threshold risk level;

if the pilot stage deployment risk level is determined to be less than the first threshold risk level, transmitting second data to the target computer system authorizing deployment of the software in a pilot stage, the second data including an indication of at least one feature of the software to be disabled during deployment of the software;

receiving configuration data characterizing a configuration state of the software in the pilot stage, the configuration data including an updated estimate of post-deployment load on the software based at least in part on configuration settings of the software during the pilot stage;

calculating a production stage deployment risk level based on the configuration data including the performance capabilities of the information technology personnel relative a recommended performance capability for personnel deploying the software and the updated estimate of post-deployment load on the software; and if the production stage deployment risk level is determined to be less than a second threshold risk level, transmitting third data to the target computer system authorizing deployment of the software in a production stage, the third data including authorization to enable the at least one previously disabled feature of the software.

2. The computer-implemented method of claim 1, wherein the software is enterprise software.

3. The computer-implemented method of claim 2, where the enterprise software provides tools and applications to manage data associated with at least one function of an organization, the at least one function selected from the group consisting of manufacturing, logistics, distribution, inventory, shipping, invoicing and accounting.

4. The computer-implemented method of claim 1, wherein the configuration parameters describing performance capabilities of information technology personnel comprise a number of information technology personnel who are slated to deploy the software and a credential status for at least one of the information technology personnel, and wherein the calculated pilot stage deployment risk level is based on the number, the credential status and a threshold recommended number of information personnel and credential status for deploying the software.

5. The computer-implemented method of claim 1, wherein the configuration parameters comprise hardware specifications of the target computer system, and wherein the calculated pilot stage deployment risk level is based on threshold recommended hardware specifications of the target computer for running the software to be deployed.

6. The computer-implemented method of claim 5, wherein the hardware specifications comprise at least one of a number of client terminals, a number of server devices, a processor speed of at least one server device, a memory specification for at least one server device, an operating system for at least one server device, or a bandwidth specification for a network that couples a server device and a client terminal.

7. The computer-implemented method of claim 1, wherein the software maintains a plurality of database tables.

8. The computer-implemented method of claim 7, wherein the estimated post-deployment load includes at least one of an estimated number of database tables to be maintained by the software, an estimated average size of a database table to be maintained by the software, and a maximum size of a database table to be maintained by the software.

9. The computer-implemented method of claim 1, further comprising generating a pilot stage deployment risk report that describes how the pilot stage deployment risk level is calculated.

10. The computer-implemented method of claim 9, wherein the pilot stage deployment risk report identifies changes that can be made to the configuration parameters to reduce the calculated pilot stage deployment risk level.

11. The computer-implemented method of claim 1, wherein the third data comprises at least a portion of the at least one previously disabled feature of the software for installation and deployment on the target computer system.

12. The computer-implemented method of claim 1, wherein at least one portion of the software is preinstalled on the target computer system in a mode in which at least one function is disabled, and wherein the second data comprises an authorization code that enables at least one of the disabled functions.

13. A computer-implemented method comprising:

providing at least one configuration parameter of a first computing system on which enterprise software is to be deployed to a second computing system, the at least one parameter characterizing an intended deployment of the enterprise software and the first computer system, the at least one parameter describing i) performance capabilities of information technology personnel slated to deploy the enterprise software and ii) an estimated post-deployment load on the enterprise software based at least in part on predicted use of the enterprise software following deployment;

receiving authorization for deployment of the enterprise software on the first computing system in a reduced-functionality state in which at least one feature of the enterprise software is disabled, wherein the authorization is determined based on whether a calculated reduced-functionality risk level is less than a first threshold risk level, wherein the calculated reduced-functionality risk level is based at least in part on the at least one parameter;

receiving configuration input into memory;

configuring at least one aspect of the enterprise software on the first computing system, based on the configuration input;

after configuring the at least one aspect, receiving data that characterizes a configuration state of the enterprise software, at least some of the data describing i) updated performance capabilities of information technology personnel slated to deploy the enterprise software and ii) an updated estimated post-deployment load on the enterprise software based at least in part on predicted use of the enterprise software following deployment and configuration settings determined during the reduced-functionality state;

transmitting the received data to the second computing system that calculates a full-functionality deployment risk level based on the received data including the updated performance capabilities of the information technology personnel relative a recommended performance capability for personnel deploying the enterprise software and the updated estimated post-deployment load on the enterprise software; and if the full-functionality deployment risk level is determined to be less than a second threshold risk level, receiving deployment authorization that enables the least one previously-disabled feature of the enterprise software.

14. The computer-implemented method of claim 13, wherein the received data describing performance capabilities of information technology personnel comprises a number of information technology personnel who are slated to deploy the enterprise software and a credential status for at least one of the information technology personnel, and wherein the calculated reduced-functionality deployment risk level is based on the number, the credential status and a threshold recommended number of information personnel and credential status for deploying the enterprise software.

15. The computer-implemented method of claim 13, wherein the received data comprises hardware specifications of the target computer system, and wherein the calculated reduced-functionality deployment risk level is based on threshold recommended hardware specifications of the target computer for running the enterprise software to be deployed.

16. The computer-implemented method of claim 15, wherein the hardware specifications comprise at least one of a number of client terminals, a number of server devices, a processor speed of at least one server device, a memory specification for at least one server device, an operating system for at least one server device, or a bandwidth specification for a network that couples a server device and a client terminal.

17. A computer program product, tangibly embodied in a machine-readable storage device, comprising instructions that, when executed, cause a processor to perform operations comprising:

receiving, into memory, first data comprising at least one configuration parameter that characterizes an intended deployment of software and a target computer system on which the software is to be deployed, at least some of the parameters describing i) performance capabilities of information technology personnel slated to deploy the software and ii) an estimated post-deployment load on the software based at least in part on predicted use of the software following deployment;

calculating a pilot stage deployment risk level based on the first data including the performance capabilities of the information technology personnel relative a recommended performance capability for personnel deploying the software and the estimated post-deployment load on the software;

determining whether the calculated pilot stage deployment risk level is less than a first threshold risk level;

if the pilot stage deployment risk level is determined to be less than the first threshold risk level, transmitting second data to the target computer system authorizing deployment of the software in a pilot stage, the second data including an indication of at least one feature of the software to be disabled during deployment of the software;

receiving configuration data characterizing a configuration state of the software in the pilot stage, the configuration data including an updated estimate of post-deployment load on the software based at least in part on configuration settings of the software during the pilot stage;

calculating a production stage deployment risk level based on the configuration data including the performance capabilities of the information technology personnel relative a recommended performance capability for personnel deploying the software and the updated estimate of post-deployment load on the software; and if the production stage deployment risk level is determined to be less than a second threshold risk level, transmitting third data to the target computer system authorizing deployment of the software in a production stage, the third data including authorization to enable the at least one previously disabled feature of the software.

18. The method of claim 1, wherein the estimated post-deployment load includes an estimated number of users of the software.

19. The method of claim 1, wherein the estimated post-deployment load includes a predicted rate of usage of the software.

* * * * *